(12) United States Patent
Becker et al.

(10) Patent No.: US 8,578,843 B2
(45) Date of Patent: Nov. 12, 2013

(54) DOMESTIC APPLIANCE INCLUDING A TREATMENT CHAMBER THAT CAN BE CLOSED BY A DOOR AND A FILLING DEVICE

(75) Inventors: Torben Becker, Bielefeld (DE); Rudolf Nordemann, Herzebrock-Clarholz (DE); Joachim Render, Warendorf (DE)

(73) Assignee: Miele & Cie. KG, Guetersloh (DE)

( * ) Notice: Subject to any disclaimer, the term of this patent is extended or adjusted under 35 U.S.C. 154(b) by 778 days.

(21) Appl. No.: 12/674,719

(22) PCT Filed: Aug. 21, 2008

(86) PCT No.: PCT/EP2008/006891
§ 371 (c)(1),
(2), (4) Date: Feb. 23, 2010

(87) PCT Pub. No.: WO2009/027052
PCT Pub. Date: Mar. 5, 2009

(65) Prior Publication Data
US 2011/0109208 A1    May 12, 2011

(30) Foreign Application Priority Data
Aug. 24, 2007  (DE) .......................... 10 2007 040 310

(51) Int. Cl.
*A47J 37/00* (2006.01)
*A21B 1/26* (2006.01)

(52) U.S. Cl.
USPC ................................ 99/474; 99/473; 219/401

(58) Field of Classification Search
USPC ............ 99/473, 474, 475, 476; 219/401, 400; 126/21 A
See application file for complete search history.

(56) References Cited

U.S. PATENT DOCUMENTS

| 4,449,026 A | * | 5/1984 | Satoh ............................ 219/682 |
| 5,515,773 A | * | 5/1996 | Bullard .......................... 99/330 |
| 6,065,171 A | | 5/2000 | Tubman et al. |
| 6,109,480 A | | 8/2000 | Monsrud et al. |

(Continued)

FOREIGN PATENT DOCUMENTS

| DE | 6606787 U | 6/1967 |
| DE | 19908181 A1 | 2/2000 |

(Continued)

OTHER PUBLICATIONS

WO 2005/012796 Feb. 10, 2005 Andoh et al.*

(Continued)

*Primary Examiner* — Reginald L Alexander
(74) *Attorney, Agent, or Firm* — Leydig, Voit & Mayer, Ltd.

(57) ABSTRACT

A household appliance includes a treatment chamber having an opening. The opening of the treatment chamber is configured to be closed by a door. The opening of the treatment chamber is bounded by at least one frame member. An external container is configured to hold at least one of an operating fluid or an operating powder. A filling device is disposed on the at least one frame member and in fluid connection with the external container. The filling device is configured to introduce, in an operating mode of the household appliance, at least one of an operating fluid and an operating powder to the treatment chamber, either treated or untreated. The filling device includes a filling device opening.

9 Claims, 4 Drawing Sheets

(56) References Cited

U.S. PATENT DOCUMENTS

| | | |
|---|---|---|
| 7,241,976 B2 | 7/2007 | Andoh et al. |
| 7,537,004 B2 | 5/2009 | Reay |
| 2007/0006864 A1 | 1/2007 | Kobayashi |
| 2008/0223086 A1 | 9/2008 | Zardetto |
| 2010/0064902 A1* | 3/2010 | Sakane et al. .................. 99/352 |

FOREIGN PATENT DOCUMENTS

| | | |
|---|---|---|
| DE | 19960743 A1 | 6/2001 |
| DE | 102006043976 A1 | 3/2008 |
| EP | 1628079 A1 | 2/2006 |
| EP | 1655542 A1 | 5/2006 |
| EP | 1724529 A1 | 11/2006 |
| EP | 1770198 A1 | 4/2007 |
| JP | 2005155998 A | 6/2005 |
| WO | WO 2008/034698 A1 | 3/2008 |

OTHER PUBLICATIONS

International Search Report for PCT/EP2003006891 mailed on Feb. 22, 2010.

* cited by examiner

DOMESTIC APPLIANCE INCLUDING A TREATMENT CHAMBER THAT CAN BE CLOSED BY A DOOR AND A FILLING DEVICE

CROSS-REFERENCE TO PRIOR APPLICATIONS

This application is a U.S. National Phase application under 35 U.S.C. §371 of International Application No. PCT/EP2008/006891, filed on Aug. 21, 2008 and claims benefit to German Patent Application No. DE 10 2007 040 310.2, filed on Aug. 24, 2007. The International Application was published in German on Mar. 5, 2009 as WO 2009/027052 A2 under PCT Article 21(2).

FIELD

The present invention relates to a household appliance including a treatment chamber that can be closed by a door, and further including a filling device.

BACKGROUND

A household appliance is described in European Patent EP 1 628 079 B1. The household appliance is embodied as a steam oven which uses superheated steam. This known steam oven has a treatment chamber that can be closed by a door, and is provided with a filling device for the introduction of an operating fluid, in this case water. In one operating mode of the known steam oven, the water supplied into the steam oven via the filling device is introduced, either treated or untreated, into the treatment chamber. Here, the treatment of the water is accomplished by a steam generator that converts the water to superheated steam, which is then fed into the treatment chamber, which is in the form of a cooking chamber. The opening of the known treatment chamber, which can be closed by a door, is bounded by at least one frame member, and the filling device is adapted to provide a fluid connection with an external container (e.g., a water bottle) that holds the operating fluid.

SUMMARY

In an embodiment, the present invention provides a household appliance including a treatment chamber having an opening. The opening of the treatment chamber is configured to be closed by a door. The opening of the treatment chamber is bounded by at least one frame member. An external container is configured to hold at least one of an operating fluid or an operating powder. A filling device is disposed on the at least one frame member and in fluid connection with the external container. The filling device is configured to introduce, in an operating mode of the household appliance, an operating fluid or an operating powder in the external container to the treatment chamber. The filling device includes a filling device opening. The filling device opening is accessible when the door is open to introduce the operating fluid or operating powder. The filling device opening is covered by the door when the door is closed.

BRIEF DESCRIPTION OF THE DRAWINGS

An exemplary embodiment of the present invention is shown in the drawings in a purely schematic way and will be described in more detail below. In the drawing.

DETAILED DESCRIPTION

Figure 1:
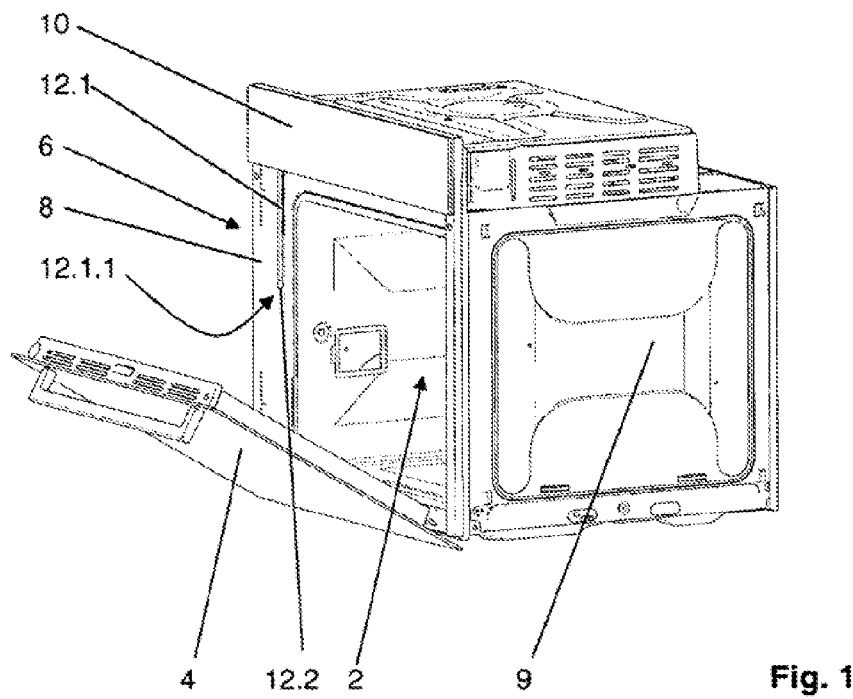
FIG. 1 is a perspective side view of a household appliance according to the present invention.

In an embodiment, the present invention provides a household appliance in which the filling device for an operating fluid of the household appliance is disposed on the household appliance in a visually unobtrusive manner.

In addition to the visually unobtrusive placement of the filling device on the household appliance, a particular advantage of the present invention over the aforementioned prior art is that in the household appliance of the present invention, the control panel can be used solely for controlling the operation of the household appliance, such as for program selection or the like. The filling device, which is not required except for the filling operation, recedes into the background both visually and during user control and operation. In addition, the arrangement according to the present invention enables current-carrying and fluid-carrying components to be separated in a more effective and structurally simpler manner. Moreover, the filling device and the opening thereof are covered during operation of the household appliance by the then closed treatment chamber door.

In a particularly advantageous embodiment of the teaching according to the present invention, the filling device has a tubular member that can be moved back and forth between a rest position, in which the tubular member substantially engages the frame member, and a filling position, in which the tubular member, or at least its free end, projects from the frame member. This allows easy filling through the filling device without hindrance by the frame member. This embodiment is particularly advantageous for the filling of operating fluid from larger containers. Alternatively to the tubular member, the opening of the filling device could be disposed, for example, on the frame member substantially in the plane thereof.

A particularly advantageous refinement of the aforementioned embodiment provides that when the tubular member is in the filling position, it is disposed on the frame in such a way that it can be automatically moved to the rest position as the door is closed. This reliably prevents the tubular member from being pinched between the door and the body of the household appliance, even in the event of careless use.

The type, arrangement, material and spatial orientation of the tubular member can, in principle, be selected within wide suitable limits. Advantageously, the tubular member is pivotably held to the frame member. Alternatively, the tubular member could also be located, for example, inside the body when in the rest position and be able to be moved out of the body as it is moved to its filling position.

In an advantageous embodiment of a tubular member pivotably held to the frame member, the tubular member forms an angle of less than 90°, especially less than 45°, with the frame member when in the filling position. Because of this, automatic movement of the tubular member from the filling position to the rest position during closure of the door is achieved in a structurally particularly simple manner.

In accordance with another advantageous embodiment, when the tubular member is in the filling position, its free end is located in front of the opening of the treatment chamber. Thus, during filling, the container holding the operating fluid may be placed on the treatment chamber door after the door is swung down to its open position, or on sheet metal trays or the like, which are supported in the treatment chamber and capable of being slid out therefrom. This is particularly advantageous when using large and therefore heavy containers.

In a further advantageous embodiment, the free end of the filling device is provided with a resilient cushion member surrounding the opening of the filling device.

This ensures that when the door is being closed, the filling device engages the door in a cushioned manner, which reduces noise and helps prevent damage to the material.

In another advantageous embodiment, the filling device is held in the rest position, in the filling position, and in all intermediate positions by a fixing means in such a manner that it cannot be displaced by gravity alone. This ensures that the tubular member can be reliably held in any position, thereby effectively preventing undesired spontaneous movement of the tubular member, for example during filling.

In accordance with a further advantageous embodiment, the range of movement of the filling device between the rest position and the filling position is limited in each of said positions by a limit stop. This ensures that the tubular member can only be moved within the predetermined desired range between the rest position and the filling position, thus effectively preventing it from moving beyond these two end positions.

FIG. 1 shows a household appliance according to the present invention, which here takes the form of a baking oven. The baking oven is a combination appliance, in which several different types of heating, such as upper and lower heat sources in the form of radiant heaters, and saturated steam, may be used depending on the selected mode or program of operation. Alternatively, or in addition to the aforementioned heating methods, it is also conceivable to use other types of heating known to those skilled in the art, such as microwave radiation, contact heating, and other types of steam, such as superheated steam.

The baking oven has a treatment chamber 2 in the form of a cooking chamber that can be closed by a door 4. Opening 6 of the treatment chamber 2, which can be closed by door 4, is bounded at the top, bottom and sides by a surrounding one-piece frame member 8 of body 9. A control panel 10 having controls and displays is disposed above treatment chamber 2 in a generally known manner.

Disposed on frame member 8 is a filling device 12, of which only a tubular member 12.1 having an opening 12.1.1 is shown in FIG. 1. Opening 12.1.1 is radially surrounded here by a resilient cushion member 12.2 made of rubber, which is fitted onto tubular member 12.1. Tubular member 12.1 is shown here in the rest position. As illustrated here, tubular member 12.1 remains in the rest position even when door 4 is open. Tubular member 12.1 can be manually moved by the user from the rest position to the filling position shown in FIG. 2. The range of movement of tubular member 12.1 is limited by the rest position and the filling position. In the rest position, tubular member 12.1 engages frame member 8 via resilient cushion member 12.2. Movement toward the filling position is limited here by a sheet-metal member 16. Thus, frame member 8 and sheet-metal member 16 each define a limit stop for tubular member 12.1. However, as an alternative to the present embodiment, it is also conceivable for tubular member 12.1 to be automatically moved from the rest position to the filling position during opening of door 4. In an embodiment of particularly simple design, this could be accomplished by means of a preloaded spring. In a more sophisticated approach, it would be conceivable to use a motor actuator, for example. The advantage of this would be that tubular member 12.1 would be moved each time door 4 is opened, but only when necessary. To this end, the motor actuator would be automatically activated by an electrical controller depending on the mode or program of operation.

Figure 2:
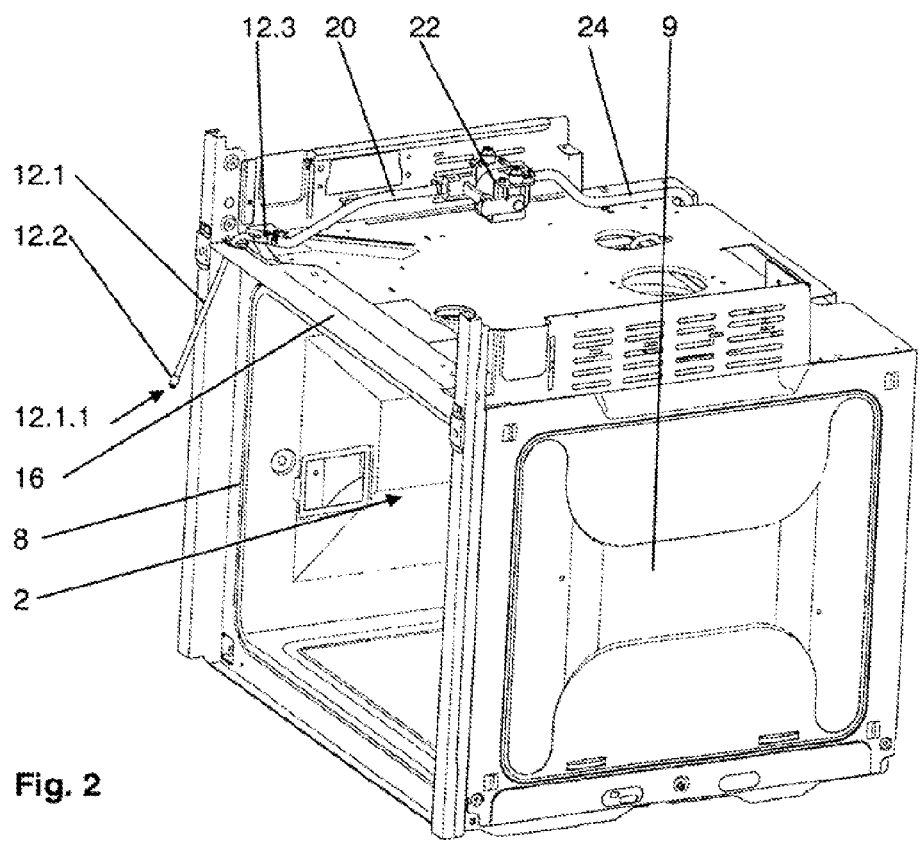
FIG. 2 is a similar but partial view showing the household appliance of FIG. 1.
Figure 3:
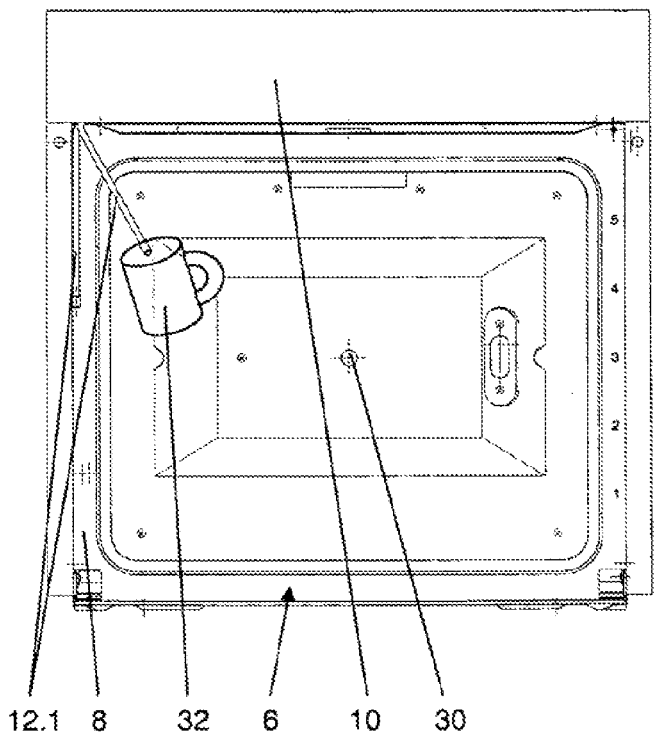
FIG. 3 is a partial front view of the household appliance.
Figure 4:
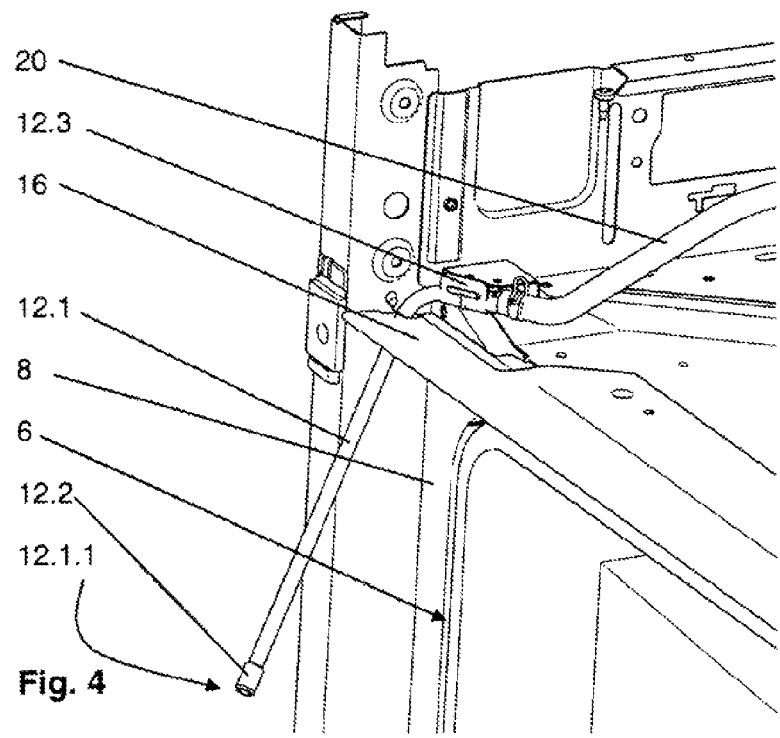
FIG. 4 is a partial, greatly enlarged view showing the household device of FIG. 2 in the region of the filling device.
Figure 5:
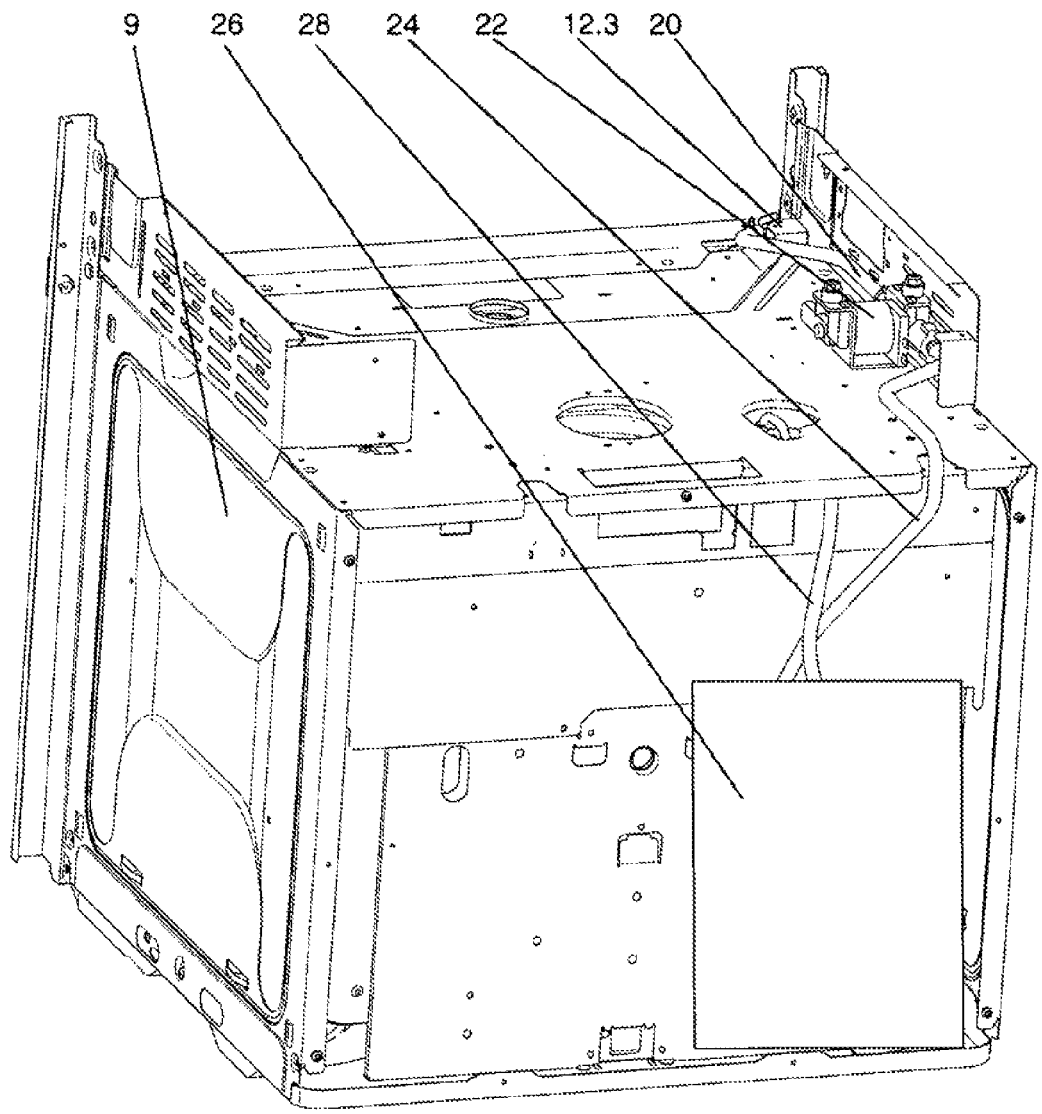
FIG. 5 is a partial rear view of the household appliance.
Figure 6:
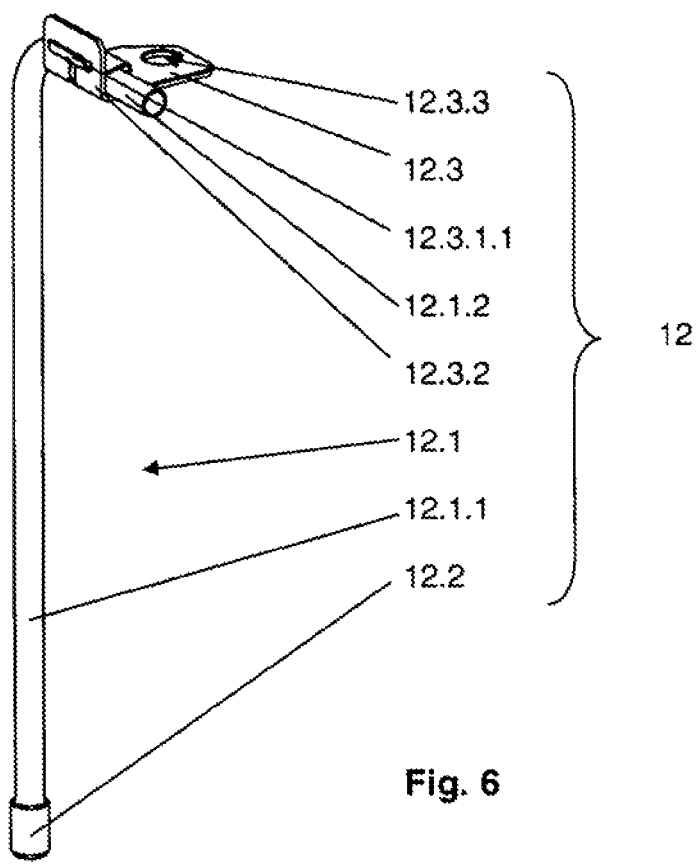
FIG. 6 is a greatly enlarged detail of the tubular member of the filling device.
Figure 7:
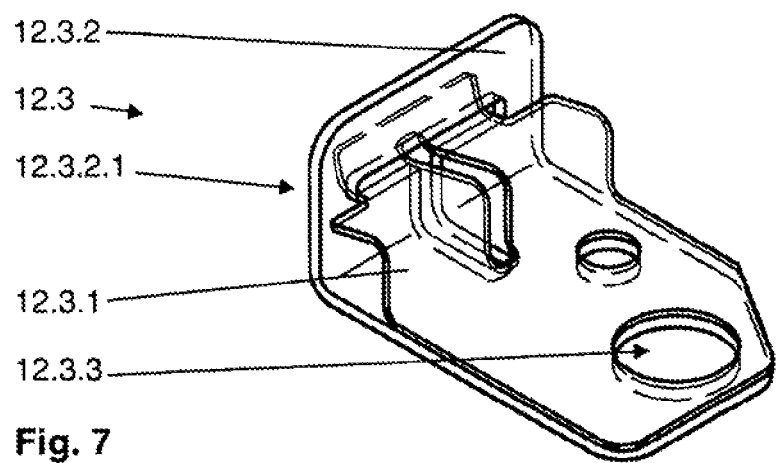
FIG. 7 is a view illustrating the mounting arrangement for the tubular member of FIG. 6.

As further shown in FIG. 2, tubular member 12.1 is pivotably secured to body 9 via a mounting arrangement 12.3, which is shown in greater detail in FIGS. 4, 6 and 7. An intake conduit 20, a pump 22, and a discharge conduit 24 are connected to tubular member 12.1 in a substantially fluid-tight manner. Intake conduit 20 is removably connected to tubular member 12.1 in a manner known to those skilled in the art so that tubular member 12.1 can be pivoted within mounting arrangement 12.3. Discharge conduit 24 is further connected to steam generator 26, which is shown in FIG. 5. In steam generator 26, the operating fluid, here water, which has been introduced into the baking oven through opening 12.1.1 of tubular member 12.1, is converted to saturated steam, which is then fed as needed into cooking chamber 2 via a steam conduit 28 and a steam port 30 shown in FIG. 3.

When a mode or program of operation that requires a predetermined amount of steam, and thus water, is selected by the user via control panel 10, the display of control panel 10 prompts the user to open door 4 and hold a container 32 filled with water (e.g. a mug) close to tubular member 12.1 in such a position that opening 12.1.1 of tubular member 12.1 is below the water level. To do this, the user pivots tubular member 12.1 from the rest position shown in FIG. 1 to the filling position shown in FIGS. 2 and 3, and positions container 32 accordingly. Filling, i.e., the filling operation, is initiated by the user actuating a control of control panel 10, for example by pressing a button. Pump 22 draws in the water from container 32 via intake conduit 20 and tubular member 12.1 and delivers it to steam generator 26 via discharge conduit 24. The display informs the user that the filling operation has been completed. Pump 22 is off, and the user may disconnect the fluid connection between container 32 and tubular member 12.1; i.e., the user may move container 32 away from tubular member 12.1 in a downward direction in the plane of the drawing in FIG. 3. As can be clearly seen in FIG. 3, the advancing and withdrawing of container 32 is facilitated here because when tubular member 12.1 is moved to the filling position, it is not only pivoted out of the plane of the drawing in FIG. 3, but also to the right toward the center of opening 6. Thus, when in the filling position, tubular member 12.1 is located in front of opening 6. For the sake of clarity, FIG. 3 shows both the rest position and the filling position of tubular member 12.1.

Once the above-mentioned filling operation has been completed, the user can pivot tubular member 12.1 back to the rest position. Alternatively, it would also be conceivable for this returning operation to be performed automatically by a motor actuator upon completion of the filling operation in a manner analogous to the automatic movement to the filling position. However, this is not absolutely necessary in the present exemplary embodiment. As can be seen from FIGS. 2 through 4, when in the filling position, tubular member 12.1 forms an angle of in this chase, 40° with frame member 8 with respect to a plane parallel to the sides of the household appliance, and an angle of, in this case, 30° with respect to a plane parallel to the front of the household appliance. This ensures that tubular member 12.1 is automatically moved from the filling position to the rest position as door 4 is closed. Alternatively to the angles in question here, it is in principle sufficient for this function if the angle with respect to a plane parallel to the sides of the household appliance is less than 90°. Moreover, it is not absolutely necessary for tubular member 12.1 to be also moved toward the center of opening 6 as it is moved to the filling position. Movement in a direction perpendicular to the plane of the drawing in FIG. 3 is, in principle, sufficient for the chosen arrangement of tubular member 12.1.

In FIG. 4, the region of the filling device 12; i.e., tubular member 12.1 with resilient cushion member 12.2 and mounting arrangement 12.3, is shown greatly enlarged in a view analogous to FIG. 2.

Tubular member 12.1 and resilient cushion member 12.2 fitted thereon, as well as mounting arrangement 12.3, are also shown separately in FIGS. 6 and 7. Tubular member 12.1 is here made of stainless steel, while resilient cushion member 12.2 is a rubber member; i.e., a plastic member having low rigidity and high elasticity. Here, cushion member 12.2 is adhesively bonded to the free end of tubular member 12.1. It is also possible to use other suitable joining methods known to those skilled in the art. Alternatively, however, it is also conceivable that tubular member 12.1 could be in the form of a plastic member of higher rigidity and/or that the resilient cushion member could be in the form of a thick film coating, for example of PTFE or the like, applied to the free end of tubular member 12.1.

Mounting arrangement 12.3 is of a two-part configuration here, including an upper part 12.3.1 and a lower part 12.3.2. Both parts 12.3.1 and 12.3.2 are manufactured from spring steel and interlocked by a tab 12.3.1.1 and an opening 12.3.2.1. Mounting arrangement 12.3 is detachably secured to body 9 by means of a screw, which engages hole 12.3.3. Tubular member 12.1, which includes a long portion 12.1.1 and a short portion 12.1.2 extending at a right angle therefrom, is pivotably held in mounting arrangement 12.3 by short portion 12.1.2. To this end, short portion 12.1.2 is clamped between upper part 12.3.1 and a lower part 12.3.2 so that tubular member 12.1 will be held in any position by frictional forces acting at the contact surfaces of short portion 12.1.2 and mounting arrangement 12.3. Alternatively, however, it is also conceivable to use other suitable joining techniques known to those skilled in the art.

The approach of the present invention is not limited to the exemplary embodiment described herein, but may also be used in other household appliances in which operating fluids are used. For example, one could conceive of using it in beverage preparing devices, in other cooking appliances, such as steam cookers, ranges, or the like, in laundry appliances, in dishwashers, or in refrigerators.

There are as many different types of operating fluids or powders that may be used as there are household appliances. In addition to water, other possible operating fluids or powders include, for example, detergents, milk, or the like. If provision is made for the operating fluid or powder to be subjected to a treatment, such treatment is adapted to the particular operating fluid or powder. In addition to heating, evaporation, and superheating of steam, other possible treatments include, for example, dissolving an operating powder in an operating fluid, or mixing one operating fluid with another.

The tubular member may also be disposed on the right side of the frame in the plane of the drawing in FIG. 3, either above of below the opening. Also, it is not necessary for frame member 5 to be circumferential in design. Instead of the tubular member, the filling device may merely include an opening in the frame member. However, in such an embodiment, it would be necessary to use either special containers having pouring aids, or an additional insertable funnel or the like. Moreover, the tubular member may be flexible or substantially rigid, and may be insertable into the body. Thus, the tubular manner would be nearly entirely received within the body except for a handle or the like, and would be pulled of the body so as to be moved to the filling position.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

What is claimed is:

1. A household appliance comprising:
   a treatment chamber having an opening, the opening of the treatment chamber configured to be closed by a door;
   at least one frame member, the opening of the treatment chamber being bounded by the at least one frame member;
   a filling device configured to form a fluid connection with a container holding an operating fluid or operating powder, the filling device being disposed on the at least one frame member and being configured to introduce, in an operating mode of the household appliance, the operating fluid or operating powder to the treatment chamber, the filling device including a filling device opening, the filling device opening being accessible, when the door is open, to introduce the operating fluid or operating powder, the filling device opening being covered by the door when the door is closed,
   wherein the filling device includes a tubular member configured to be moved back and forth between a rest position and a filling position, the tubular member substantially engaging the at least one frame member in the rest position and at least a portion of the tubular member projecting from the at least one frame member in the filling position.

2. The household appliance as recited in claim 1, wherein the tubular member is disposed in the filling position on the at least one frame so as to be automatically moved to the rest position as the door is closed, 3. The household appliance as recited in claim 1, wherein the tubular member is pivotably held to the frame member.

4. The household appliance as recited in claim 3, wherein, in the filling position, the tubular member forms an angle of less than 90° with the at least one frame member.

5. The household appliance as recited in claim 1, wherein, in the filling position, a free end of the tubular member is disposed in front of the opening of the treatment chamber.

6. The household appliance as recited in claim 1, wherein a free end of the tilling device includes a resilient cushion member surrounding the filling device opening.

7. The household appliance as recited in claim 1, further comprising a fixing member for holding the filling device so as to avoid displacement by gravity.

8. The household appliance as recited in claim 1, further comprising a limit stop configured to limit a range of movement of the tubular member between the rest position and the filling position.

9. The household appliance as recited in claim 1, wherein the at least a portion of the tubular member is a free end thereof.

* * * * *